(12) United States Patent
Davies et al.

(10) Patent No.: US 9,597,895 B2
(45) Date of Patent: Mar. 21, 2017

(54) NEGOTIABLE INSTRUMENTS WITH INTELLIGENT MICROPRINT

(71) Applicant: Deluxe Corporation, Shoreview, MN (US)

(72) Inventors: David S. Davies, Ham Lake, MN (US); Robert A. Owen, Forest Lake, MN (US)

(73) Assignee: Deluxe Corporation, Shoreview, MN (US)

( * ) Notice: Subject to any disclaimer, the term of this patent is extended or adjusted under 35 U.S.C. 154(b) by 0 days.

(21) Appl. No.: 14/615,625

(22) Filed: Feb. 6, 2015

(65) Prior Publication Data

US 2015/0154478 A1 Jun. 4, 2015

Related U.S. Application Data

(63) Continuation of application No. 13/289,840, filed on Nov. 4, 2011, now Pat. No. 9,126,400.

(51) Int. Cl.

| | |
|---|---|
| *G06F 19/00* | (2011.01) |
| *B41J 3/01* | (2006.01) |
| *B42D 25/21* | (2014.01) |
| *B42D 25/30* | (2014.01) |
| *G06F 3/12* | (2006.01) |
| *G06K 15/02* | (2006.01) |
| *G06Q 30/06* | (2012.01) |
| *G06Q 40/02* | (2012.01) |
| *H04N 1/32* | (2006.01) |

(52) U.S. Cl.
CPC ............ *B41J 3/01* (2013.01); *B42D 25/21* (2014.10); *B42D 25/30* (2014.10); *G06F 3/1258* (2013.01); *G06K 15/1809* (2013.01); *G06K 15/1852* (2013.01); *G06Q 30/0621* (2013.01); *G06Q 30/0635* (2013.01); *G06Q 40/02* (2013.01); *H04N 1/32149* (2013.01)

(58) Field of Classification Search
USPC ........................................ 235/379, 380, 494
See application file for complete search history.

(56) References Cited

U.S. PATENT DOCUMENTS

| | | |
|---|---|---|
| 5,085,417 A | 2/1992 | Copham |
| 5,924,737 A | 7/1999 | Schrupp |
| 6,111,953 A | 8/2000 | Walker et al. |
| | (Continued) | |

OTHER PUBLICATIONS

"U.S. Appl. No. 13/289,840, Final Office Action mailed Feb. 6, 2014", 15 pgs.

(Continued)

*Primary Examiner* — Daniel Hess
(74) *Attorney, Agent, or Firm* — Schwegman Lundberg & Woessner, P.A.

(57) ABSTRACT

A negotiable instrument such as a check includes a unique microprint identifier that allows for authentication while preventing unauthorized reproduction and alternation. A printing system generates the identifier after receiving a customer order for printing a plurality of negotiable instruments, to allow inclusion of information that is specific to the customer order and/or the printing process. In various embodiments, the identifier is unique to each or each subset of the plurality of negotiable instruments and facilitates authentication of each of the negotiable instruments when needed.

20 Claims, 6 Drawing Sheets

(56) References Cited

U.S. PATENT DOCUMENTS

| | | | |
|---|---|---|---|
| 6,153,557 | A | 11/2000 | Nakanishi |
| 6,390,362 | B1 | 5/2002 | Martin |
| 6,808,118 | B2 | 10/2004 | Field |
| 6,929,413 | B2 | 8/2005 | Schofield |
| 7,270,918 | B2 | 9/2007 | Blood et al. |
| 9,126,400 | B2 | 9/2015 | Davies et al. |
| 2006/0230273 | A1* | 10/2006 | Crichton ............... G03G 15/50 713/176 |
| 2007/0056041 | A1 | 3/2007 | Goodman |
| 2008/0225319 | A1 | 9/2008 | Takada |
| 2013/0112759 | A1 | 5/2013 | Davies et al. |

OTHER PUBLICATIONS

"U.S. Appl. No. 13/289,840, Non Final Office Action mailed Jun. 6, 2013", 13 pgs.
"U.S. Appl. No. 13/289,840, Notice of Allowance mailed May 11, 2015", 9 pgs.
"U.S. Appl. No. 13/289,840, Notice of Allowance mailed Nov. 7, 2014", 9 pgs.
"U.S. Appl. No. 13/289,840, Response filed Apr. 7, 2014 to Final Office Action mailed Feb. 6, 2014", 7 pgs.
"U.S. Appl. No. 13/289,840, Response filed Sep. 6, 2013 to Non Final Office Action mailed Jun. 6, 2013", 10 pgs.

\* cited by examiner

NEGOTIABLE INSTRUMENTS WITH INTELLIGENT MICROPRINT

PRIORITY APPLICATIONS

This application is a Continuation of U.S. patent application Ser. No. 13/289,840, filed Nov. 4, 2011, which is incorporated herein by reference in its entirety.

TECHNICAL FIELD

This application relates generally to security features on financial documents and more particularly to negotiable instruments with unique microprint identifiers.

BACKGROUND

Negotiable instruments including checks are frequently used by organizations and individuals in financial transactions. Various security features have been incorporated into negotiable instruments for anti-counterfeiting purposes. Because financial fraud employing counterfeiting of documents remains an issue, there is a need to introduce enhanced security features for preventing unauthorized reproduction and alternation of printed negotiable instruments.

SUMMARY

A negotiable instrument such as a check includes a unique microprint identifier that allows for authentication while preventing unauthorized reproduction and alternation. A printing system generates the identifier after receiving a customer order for printing a plurality of negotiable instruments, to allow inclusion of information that is specific to the customer order and/or the printing process. In various embodiments, the identifier is unique to each or each subset of the plurality of negotiable instruments and facilitates authentication of each of the negotiable instruments when needed.

In one embodiment, a system for printing documents includes a printing device, suitable for printing negotiable instruments including microprint images. The printing device includes a data interface, an identifier generator, an image generator, and a printing module. The data interface receives data associated with a customer order for printing a plurality of negotiable instruments. The identifier generator generates unique identifiers for the plurality of negotiable instruments using the data associated with the customer order. The unique identifiers are each unique for a set of negotiable instruments of the plurality of negotiable instruments. The image generator generates an image for each negotiable instrument of the plurality of negotiable instruments. The image includes an intelligent microprint identifier including one of the unique identifiers to be printed at a microprint level. The printing module prints the plurality of negotiable instruments.

In one embodiment, a method for printing documents is provided. Information associated with a customer order for printing a plurality of negotiable instruments is received. Unique identifiers are generated for the plurality of negotiable instruments using the information associated with the customer order. The unique identifiers are each unique for a set of negotiable instruments of the plurality of negotiable instruments. An image is generated for each negotiable instrument of the plurality of negotiable instruments. The image includes an intelligent microprint identifier including one of the unique identifiers to be printed at a microprint level. Each negotiable instrument is printed using the image.

In one embodiment, a plurality of negotiable instruments printed in response to an order placed by a customer includes a microprint image printed on each negotiable instrument of the plurality of negotiable instruments. The microprint image includes a unique identifier generated at a time of printing the plurality of negotiable instruments for each sheet of a plurality of sheets of negotiable instruments to be printed. Each sheet includes one or more negotiable instruments of the plurality of negotiable instruments.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

The following detailed description refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

This document discusses a method and apparatus for producing negotiable instruments such as checks with intelligent microprint as an anti-counterfeiting security feature. Microprint has been employed in checks, for example, as a line of small text that is difficult to read with naked eye, and is reproduced as a solid or dotted line by most photocopiers or scanners. For example, some personal checks each include a microprint of text as the signature line and an "MP" mark indicating this feature to potential users. To introduce additional security to documents ordered by a customer, the present method and apparatus create a unique identifier to be printed at a microprint level on each document, each document sheet, or each subset of the documents after receiving the order to include information specific to the order. In one embodiment, the unique identifier is created at the time of printing to include information specific to the printing process. When compared with a fixed image for all the documents, such unique identifier as an "intelligent microprint identifier" increases the difficulty of reproducing the documents such as by using printing press. Additionally, the unique identifier provides specific and unique information allowing for authentication, such as the date and/or time of printing and/or order reception. Such specific and unique information is not available from predetermined fixed images.

Figure 1:
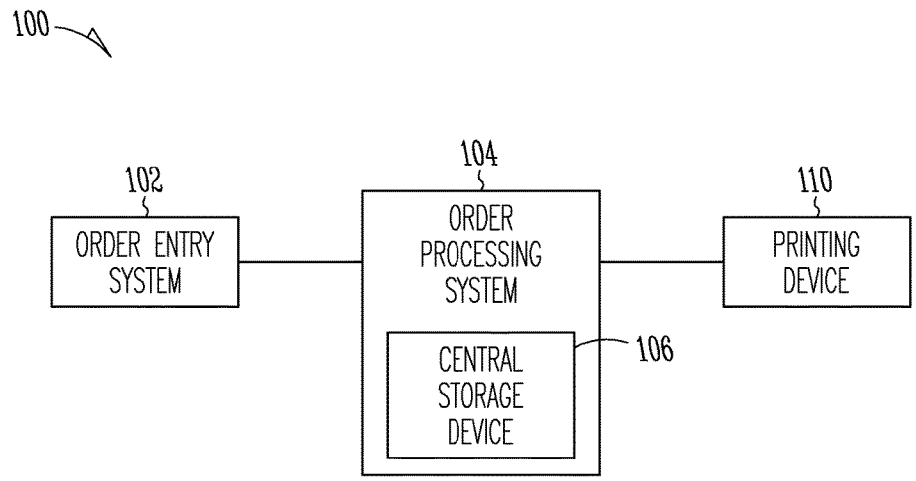
FIG. 1 is a block diagram illustrating an embodiment of a system for printing negotiable instruments with intelligent microprint in response to a customer order.

FIG. 1 is a block diagram illustrating an embodiment of a system 100 for printing negotiable instruments with intelligent microprint in response to a customer order. System 100 includes an order entry system 102, an order processing system 104, and a printing device 110. In various embodiments, the negotiable instruments include checks, such as cashier's checks or personal checks.

Order entry system 102 receives orders for financial documents. Such orders include an order placed by a customer for printing a plurality of negotiable instruments, which is referred to as "the customer order" and used as an example for discussion of the present subject matter in this document. Order processing system 104 processes the customer order and sends data associated with the customer order to printing device 110 for printing the plurality of negotiable instruments. In the illustrated embodiment, order processing system 104 includes a central storage device 106 to store information associated with the received orders, including security information associated with the customer order. The security information allows for future authentication of each negotiable instrument of the plurality of negotiable instruments specified by the customer order. Printing device 110 is suitable for printing negotiable instruments that include microprint images.

Figure 2:
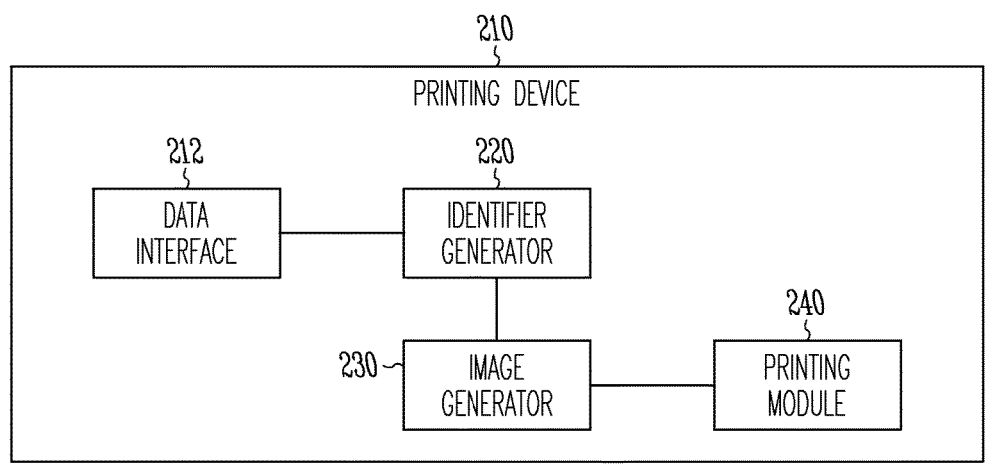
FIG. 2 is a block diagram illustrating an embodiment of a printing device for printing the negotiable instruments.

FIG. 2 is a block diagram illustrating an embodiment of a printing device 210 for printing the negotiable instruments. Printing device 210 represents an embodiment of printing device 110 and includes a data interface 212, an identifier generator 220, an image generator 230, and a printing module 240. Data interface 212 communicates with order processing system 104 to receive data associated with the customer order for printing the plurality of negotiable instruments. Identifier generator 220 generates unique identifiers for the plurality of negotiable instruments using identification information associated with the customer order. The unique identifiers are each unique for a set of negotiable instruments of the plurality of negotiable instruments. In various embodiments, the set of negotiable instruments include one negotiable instrument, a sheet of several negotiable instruments, several sheets each including one or more negotiable instruments, or any subset of the plurality of negotiable instruments. The identification information is associated with the customer order, including the data associated with the customer order. Image generator 220 generates an image for each negotiable instrument of the plurality of negotiable instruments. The image includes an intelligent microprint identifier including one of the unique identifiers to be printed at a microprint level. Printing module 240 prints the plurality of negotiable instruments. In various embodiments, printing module 240 uses inkjet, laser etching, or any other technology suitable for producing printed negotiable instruments that include microprint images.

In various embodiments, printing device 210 includes a printer that is customized to perform the various functions discussed in this document. In one embodiment, printing device 210 includes a digital printer that is programmable for performing the functions of identifier generator 220 and image generator 230, including their various embodiments as discussed in this document.

Figure 3:
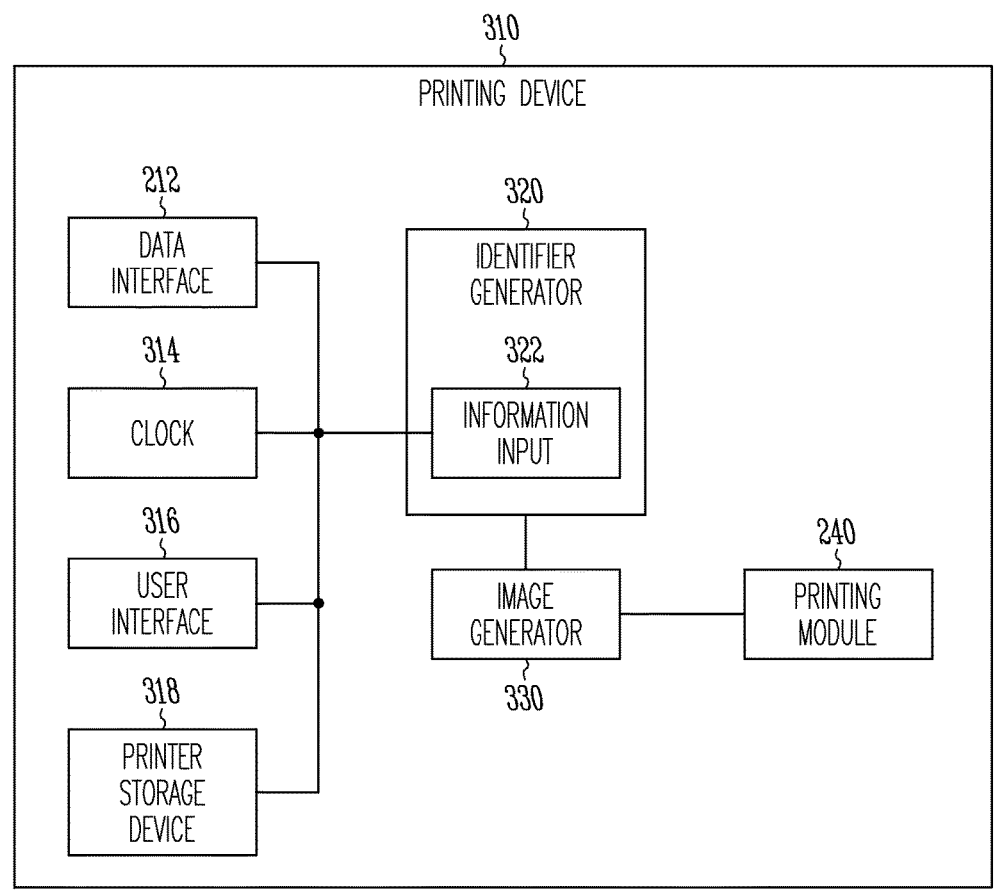
FIG. 3 is a block diagram illustrating another embodiment of the printing device for printing the negotiable instruments.

FIG. 3 is a block diagram illustrating an embodiment of a printing device 310 for printing the negotiable instruments. Printing device 310 represents an embodiment of printing device 210 and includes data interface 212, a clock 314, a user interface 316, a printer storage device 318, an identifier generator 320, an image generator 330, and printing module 240.

Clock 314 tracks date and time to allow for recording of date(s) and/or time(s) of the printing task performed by printing device 310 in response to the customer order. User interface 316 receives one or more user instructions including instructions specific to the customer order. In various embodiments, an operator of printing device 310 enters the one or more user instructions, such as commands and/or information associated with printing of the plurality of negotiable instruments that is not automatically generated by system 100. Printer storage device 318 stores information related to the customer order. In various embodiments, the information includes the received data associated with the customer order and the one or more user instructions.

Identifier generator 320 represents an embodiment of identifier generator 220 and generates the unique identifiers for the plurality of negotiable instruments using the identification information associated with the customer order. The unique identifiers are each unique for a set of negotiable instruments of the plurality of negotiable instruments. Identifier generator 320 includes an information input 322 to receive the identification information from data interface 212, clock 314, user interface 316, and/or storage device 318. In various embodiments, printer storage device 318 stores data representing the unique identifiers generated by identifier generator 320 as part of the information associated with the customer order. In various embodiments, printing device 310 transmits the data representing the unique identifiers to order processing system 104 via data interface 212. Central storage device 106 stores the data representing the unique identifiers as part of the security information associated with the customer order.

In one embodiment, the set of negotiable instruments includes one negotiable instrument of the plurality of negotiable instruments. In other words, identifier generator 320 generates a unique identifier for each negotiable instrument the plurality of negotiable instruments specified in the customer order. In another embodiment, the set of negotiable instruments includes multiple negotiable instruments arranged on one sheet. In other words, identifier generator 320 generates a unique identifier for each sheet of a plurality of sheets to be printed, and each sheet includes one or more negotiable instruments of the plurality of negotiable instruments specified in the customer order. For example, each sheet may include about 1 to 15 checks to be printed according to the customer order.

In various embodiments, the unique identifiers each include information allowing for authentication of each negotiable instrument of the plurality of negotiable instruments. A unique identifier is printed on each negotiable instrument of the plurality of negotiable instruments. In one embodiment, the unique identifiers each include a unique code. The unique code including, for example, production information specific to the printing of the plurality of negotiable instruments, order information identifying the customer order, and account information identifying the account associated with each negotiable instrument of the plurality of negotiable instruments. The production information becomes available at the time of printing. The order information is generated by order processing system 104 after the customer order is received. The account information may also be printed legibly on each of the negotiable instrument of the plurality of negotiable instruments. Such information and the unique code are further discussed below with reference to FIG. 5. In one embodiment, the unique code includes at least the order information, and identifier generator 320 generates the unique identifiers after receiving the data associated with the customer order. In one embodiment, the unique code includes at least the production information, and identifier generator 320 generates the unique identifiers at the time of the printing.

Image generator 330 generates an image for each negotiable instrument of the plurality of negotiable instruments. The image includes an intelligent microprint identifier including one of the unique identifiers to be printed at a microprint level by the printing module 240. An "intelligent microprint identifier" refers to a document identifier that is printed on a document at a microprint level and includes one of the unique identifiers as discussed in this document. The intelligent microprint identifier is suitable for preventing reproduction and alteration using most commercially available photocopiers and scanners. In one embodiment, the intelligent microprint identifier includes a line of text representing the unique code. The line of text when reproduced using most commercially available photocopiers or scanners appears as a solid or dotted line. In various embodiments, the line of text is printed as a line on a check, such as a date line, a payee ("pay to the order of") line, an amount line, a memo line on a check, or a signature line. In one embodiment, the image for each negotiable instrument includes a predetermined microprint image in addition to the intelligent microprint identifier.

Figure 4:
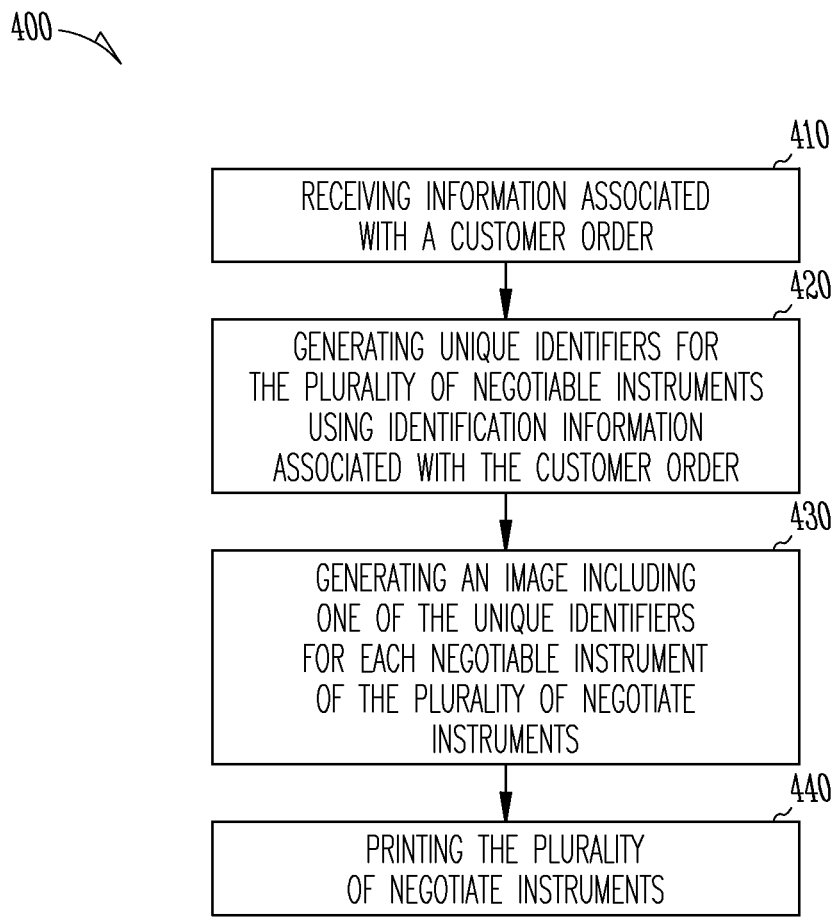
FIG. 4 is a flow chart illustrating an embodiment of a method for printing negotiable instruments with intelligent microprint identifiers.

FIG. 4 is a flow chart illustrating an embodiment of a method 400 for printing negotiable instruments with intelligent microprint identifiers. In one embodiment, the method is performed using system 100, with printing device 110 including its various embodiments as discussed in this document. In one embodiment, a commercial digital printing system is programmed to perform method 400. One example of such a digital printing system includes a Kodak Digimaster Digital Production Platform, with custom software developed to print checks with intelligent microprint identifiers as discussed in this document.

At 410, information associated with the customer order is received. In various embodiments, the information may include user instructions and stored information. The user instructions include instructions specific to the customer order entered by the operator executing the customer order. The stored information is related to the customer order, such as stored account information associated with the customer order.

At 420, unique identifiers are generated for the plurality of negotiable instruments specified in the customer order using identification information associated with the customer order. The unique identifiers are each unique for a set of negotiable instruments of the plurality of negotiable instruments. In one embodiment, the identification information includes information extracted from the received information associated with the customer order. In one embodiment, the identification information includes information that is generated at the time of printing and specific to the printing as execution of the customer order. In various embodiments, the set of negotiable instruments includes one or more negotiable instruments being a subset of the plurality of negotiable instruments. In one embodiment, the set of negotiable instruments includes negotiable instruments arranged on one sheet to be printed. A unique identifier is generated for each sheet of a plurality of sheets to be printed, with each sheet including one or more negotiable instruments of the plurality of negotiable instruments specified in the customer order. In various embodiments, the unique identifier is to be printed on each negotiable instrument of the plurality of negotiable instruments, and includes information allowing for authentication of the negotiable instrument on which it is printed. In one embodiment, the unique identifier includes a unique code. In various embodiments, the unique code includes, for example, information selected from the production information, the order information, and/or the account information as discussed above production information specific to the printing of the plurality of negotiable instruments, order information identifying the order placed by the customer, and account information identifying the account associated with each negotiable instrument of the plurality of negotiable instruments, as further discussed below with reference to FIG. 5. In one embodiment, the unique identifier is generated after receiving the information associated with the customer order to include at least the order information. In one embodiment, the unique identifier is generated at the time of the printing to include the production information.

At 430, an image is generated for each negotiable instrument of the plurality of negotiable instruments. The image includes an intelligent microprint identifier including one of the unique identifier to be printed at a microprint level. In one embodiment, the intelligent microprint identifier includes a line of text representing the unique code. The line of text is difficult to read with the naked eyes and appears as a solid or dotted line when being reproduced using a commercially available photocopier or scanner. In various embodiments in which the negotiable instruments include checks such as cashier's checks or personal checks, the line of text is printed on each of the checks as a date line, a payee ("pay to the order of") line, an amount line, a memo line, and a signature line. In one embodiment, the image for each negotiable instrument includes a predetermined fixed microprint image in addition to the intelligent microprint identifier.

At 440, the plurality of negotiable instruments is printed using the images each generated for one negotiable instrument of the plurality of negotiable instruments. In various embodiments, the plurality of negotiable instruments is printed using inkjet, laser etching, or any other technology suitable for producing negotiable instruments with microprint images as discussed in this document.

In various embodiments, in addition to printing the negotiable instruments by executing the customer order, security information associated with the customer order is stored to allow for future authentication of each negotiable instrument of the plurality of negotiable instruments specified by the customer order. The security information includes data representing the unique identifiers each generated for, and printed as the intelligent microprint image, for one negotiable instrument of the plurality of negotiable instruments.

Figure 5:
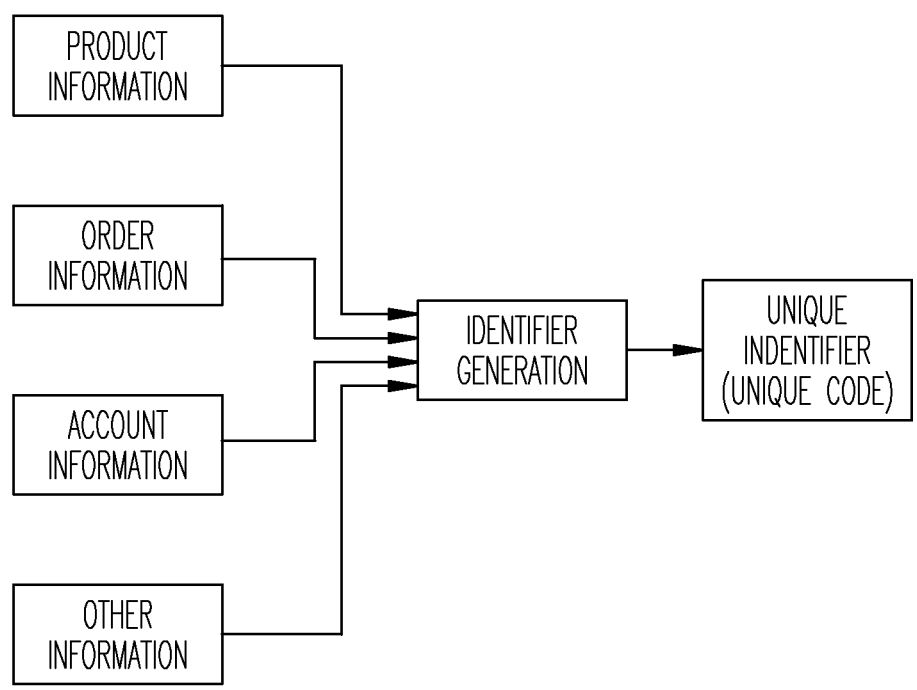
FIG. 5 is an illustration of an embodiment of generating a unique identifier using various types of information.

FIG. 5 is an illustration of an embodiment of identifier generation performed by identifier generator 220 or 320. In the illustrated embodiment, the unique identifier as discussed above is generated using the production information, order information, account information, and other information. In various embodiments, the unique identifier as discussed above is generated using any one or more of the production information, order information, account information, or other information. In one embodiment, the unique identifier is generated as a unique code generated as a function of the production information, order information, account information, and/or other information.

In various embodiments, the production information is specific to the printing of the plurality of negotiable instruments and includes, but is not limited to time of printing, date of printing, place of printing, batch number, printer identification, operator identification, product group, and position of order. Such product information becomes available at the time of printing. The order information identifies the order placed by the customer and includes, but is not limited to date of the order, volume specified in the order, and information of the customer placing the order. Such order information is available after the customer order is received. The account information identifies the account associated with the plurality of negotiable instruments and includes, but not limited to account number, information identifying the customer and/or account owner (if different), financial institution information, check number, and other information associated with the customer and/or account owner such as zip code. In various embodiments, the account information is also printed legibly on each negotiable instrument of the plurality of negotiable instruments. The other information includes any information that allows for future authentication of each negotiable instrument of the plurality of negotiable documents. Such information may include information entered manually by the operator executing the customer order and/or randomly generated information.

Figure 6A:
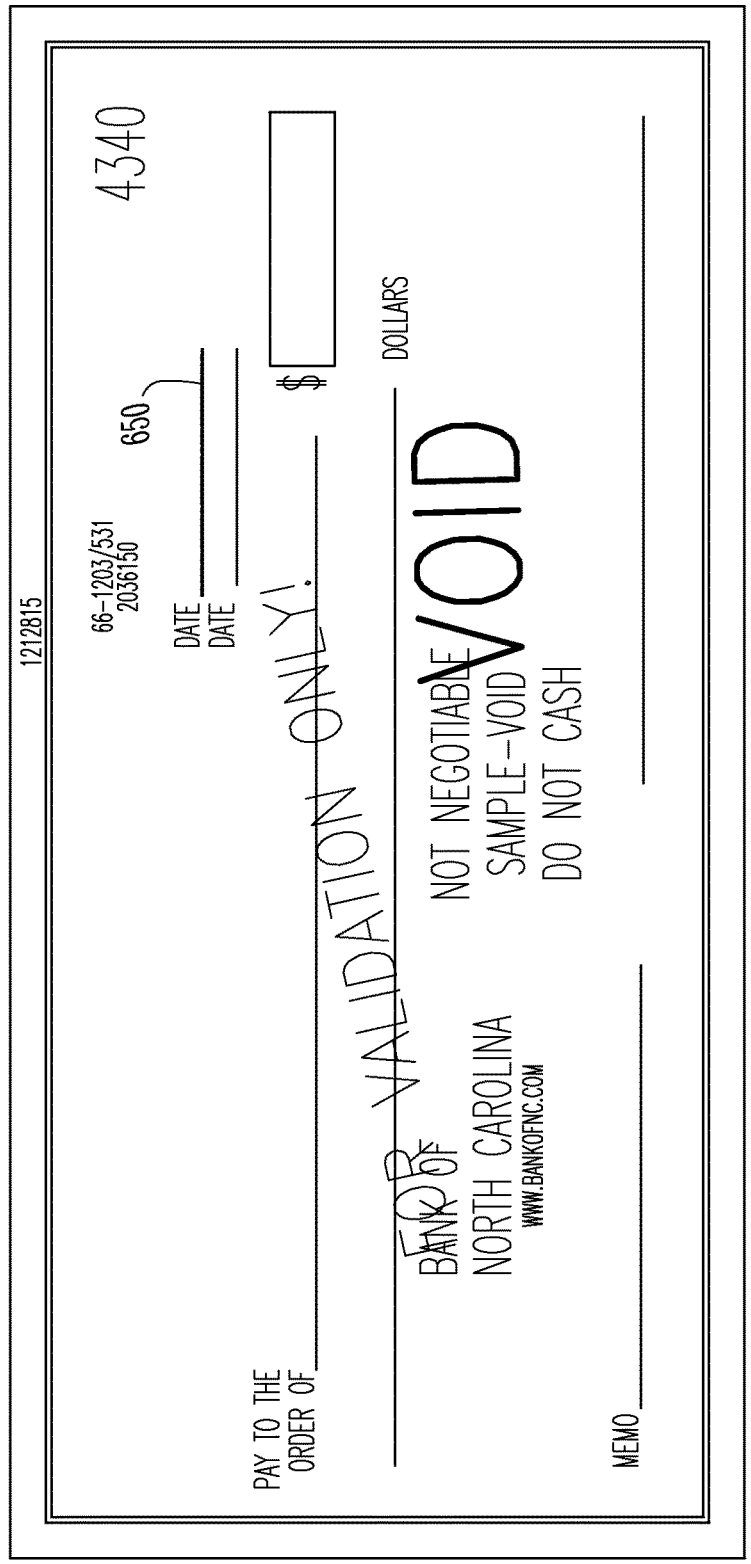
FIG. 6A is an image of a portion of a check illustrating an embodiment of an intelligent microprint identifier.
Figure 6B:
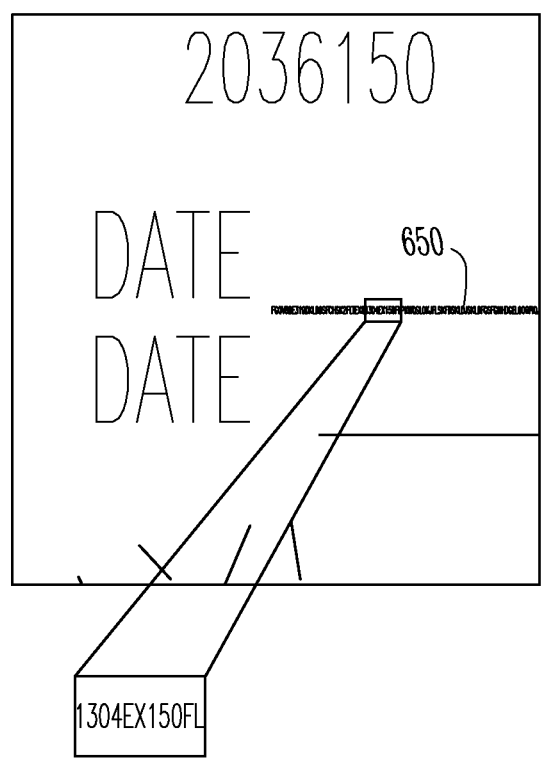
FIG. 6B is an image showing an enlarged portion of the intelligent microprint identifier.

FIG. 6A is an image of a portion of a check illustrating an embodiment an intelligent microprint identifier. The check is illustrated as an example of a negotiable instrument with an intelligent microprint identifier 650. Intelligent microprint identifier 650, as presented by way of example, but not by way of limitation, is the date line of the check (printed next to a "plain" date line for comparison as illustrated). FIG. 6B is an image showing an enlarged portion of intelligent microprint identifier 650, with a further magnified portion including a code segment that reads "1304EX150FL". The check as illustrated in FIGS. 6A-B was printed using a Kodak Digimaster EX150 Digital Production System with M1 MICR toner and custom software developed for printing the intelligent microprint identifier.

It is understood that other combinations and configurations may be employed without departing from the scope of the present subject matter. This application is intended to cover adaptations or variations of the present subject matter. It is to be understood that the above description is intended to be illustrative, and not restrictive. The scope of the present subject matter should be determined with reference to the appended claims, along with the full scope of equivalents to which such claims are entitled.

What is claimed is:

1. A system for printing documents, comprising:
   an order processing system configured to receive and process data associated with a customer order for printing a plurality of negotiable instruments, the order processing system including a storage device configured to store security information allowing for future authentication of each negotiable instrument of the plurality of negotiable instruments; and
   a printing device suitable for printing negotiable instruments including microprint images, the printing device including:
     an identifier generator configured to receive production information at a time of printing the plurality of negotiable instruments and generate codes identifying the plurality of negotiable instruments, the production information being specific to the printing of the plurality of negotiable instruments that becomes available at the time of printing the plurality of negotiable instruments, the plurality of negotiable instruments being divided into subsets for the printing the subsets each including multiple negotiable instruments of the plurality of negotiable instruments, the codes each being unique for one of the subsets of the plurality of negotiable instruments and being a function of the production information and information identifying the customer order;
     an image generator configured to generate an image for each negotiable instrument of the plurality of negotiable instruments, the image including an intelligent microprint identifier including one of the codes to be printed at a microprint level as an anti-counterfeiting security feature;
     a printing module configured to print the plurality of negotiable instruments; and
     a data interface configured to receive the data associated with the customer order from the order processing system and transmit data representing the codes to the order processing system.

2. The system of claim 1, wherein the plurality of negotiable instruments comprises a plurality of checks.

3. The system of claim 2, wherein the printing device comprises a clock, and the codes are each a function of a date of the printing.

4. The system of claim 3, wherein the printing device comprises a clock, and the codes are each a function of a time of the printing.

5. The system of claim 2, wherein the storage device is configured to store the data representing the codes as part of the security information.

6. The system of claim 5, wherein the identifier generator is configured to generate the codes each being unique for one check of the plurality of checks.

7. The system of claim 5, wherein the identifier generator is configured to generate the codes each being unique for each sheet of a plurality of sheets to be printed, the each sheet including a set of checks of the plurality of checks.

8. The system of claim 5, wherein the printing device comprises a user interface to receive one or more user instructions including one or more instructions specific to the customer order, and the identifier generator is configured to generate the codes using the one or more user instructions.

9. The system of claim 1, wherein the identifier generator is further configured to receive information entered manually by an operator executing the customer order, and the codes are each a function of the information entered manually by the operator executing the customer order.

10. The system of claim 1, wherein the identifier generator is further configured to receive randomly generated information, and the codes are each a function of the randomly generated information.

11. A plurality of negotiable instruments printed in response to an order placed by a customer, comprising:
    microprint images each being an anti-counterfeiting security feature printed on a negotiable instrument of the plurality of negotiable instruments, the microprint images including codes generated as a function of production information specific to printing of the plurality of negotiable instruments that becomes available at a time of the printing, the plurality of negotiable instruments being divided into subsets for the printing, the subsets each including multiple negotiable instruments of the plurality of negotiable instruments to be printed on a sheet of a plurality of sheets, the codes each being unique for a sheet of the plurality of sheets.

12. The plurality of negotiable instruments of claim 11, comprising a plurality of checks, and wherein the microprint image is printed on each check of the plurality of checks.

13. The plurality of negotiable instruments of claim 12, the microprint images each comprise a line of text representing the unique code.

14. The plurality of negotiable instruments of claim 13, wherein the line of text is printed as a date line.

15. The plurality of negotiable instruments of claim 13, wherein the line of text is printed as a payee line.

16. The plurality of negotiable instruments of claim 13, wherein the line of text is printed as an amount line.

17. The plurality of negotiable instruments of claim 13, wherein the line of text is printed as a memo line.

18. The plurality of negotiable instruments of claim 13, wherein the line of text is printed as a signature line.

19. The plurality of negotiable instruments of claim 13, wherein the codes are each a function of information entered manually by an operator executing the order placed by the customer.

20. The plurality of negotiable instruments of claim 13, wherein the codes are each a function of randomly generated information.

\* \* \* \* \*

UNITED STATES PATENT AND TRADEMARK OFFICE
CERTIFICATE OF CORRECTION

PATENT NO. : 9,597,895 B2
APPLICATION NO. : 14/615625
DATED : March 21, 2017
INVENTOR(S) : Davies et al.

It is certified that error appears in the above-identified patent and that said Letters Patent is hereby corrected as shown below:

In the Claims

Column 8, Line 7-8, in Claim 1, after "printing", insert --,--

Signed and Sealed this
Twenty-first Day of April, 2020

Andrei Iancu
*Director of the United States Patent and Trademark Office*